(12) United States Patent
McEdwards

(10) Patent No.: US 7,069,986 B2
(45) Date of Patent: Jul. 4, 2006

(54) PORTABLE, SURFACE-MOUNTED WELL PUMP

(76) Inventor: Donald George McEdwards, 1025 Hearst-Willits Rd., Willits, CA (US) 95490

( * ) Notice: Subject to any disclaimer, the term of this patent is extended or adjusted under 35 U.S.C. 154(b) by 0 days.

(21) Appl. No.: 10/622,620

(22) Filed: Jul. 17, 2003

(65) Prior Publication Data

US 2005/0013707 A1    Jan. 20, 2005

(51) Int. Cl.
    *F04B 17/00*    (2006.01)
(52) U.S. Cl. .................. 166/69.5; 417/415; 417/423.1
(58) Field of Classification Search ............... 166/369, 166/68, 69.5, 105; 74/55, 56, 57; 417/415, 417/423.2

See application file for complete search history.

(56) References Cited

U.S. PATENT DOCUMENTS

| | | | | |
|---|---|---|---|---|
| 2,496,688 A | * | 2/1950 | Armstrong | ................. 417/568 |
| 2,702,025 A | * | 2/1955 | Bacchi | ........................ 91/309 |
| 3,359,809 A | * | 12/1967 | Spender | ......................... 74/55 |
| 6,474,962 B1 | * | 11/2002 | Allen et al. | .............. 417/423.6 |

* cited by examiner

Primary Examiner—William Neuder

(57) ABSTRACT

A portable pump includes a rotating elliptical plate mounted on a rotating shaft, an elliptical plate follower with rollers or bearings positioned on the top and bottom surfaces of the rotating elliptical plate at a fixed distance from the axis of the supporting rotating shaft, rollers or bearings on the plate follower mated to roller or bearing races to restrict movement of the elliptical plate follower to directions parallel to the axis of the rotating shaft, a well pump tube with a bottom check valve affixed to the elliptical plate follower so that horizontal rotation of elliptical plate causes alternate vertical lifting and draining of the pump tube so as to pump water or other fluids from a well. Alternate embodiments of the invention replace the well pump tube and check valve with a driven piston, confining cylinder, and check valves to allow creation of a partial vacuum, compression of a fluid, or pumping of any flowable material.

4 Claims, 2 Drawing Sheets

PORTABLE, SURFACE-MOUNTED WELL PUMP

BACKGROUND OF THE INVENTION

Monitoring wells installed as part of groundwater investigations related to leaking surface or underground storage tanks are typically constructed of two or four inch diameter PVC casing and well screen to between 20 to 100+ feet depending on the depth to groundwater. The protocol for taking water samples from these monitoring wells requires that the well be pumped or bailed until three to five well volumes have been removed, the well dewaters, or successive measures of indicator parameters pH, temperature, and electrical conductivity have stabilized.

For water level depths less than about 25 feet an electric surface suction pump and an inwell purge tube is often used to pump the well. The inwell purge tube has a check valve at is bottom so that rapid up and down motion of the purge tube will fill the tube with water and allow the surface suction pump to be primed. Once the surface suctions pump is primed, the pump will deliver water from the well until the water level declines to a theoretical limit of about 30 feet below the suction pump depending on ambient atmospheric pressure (14.7 psi=33.9 feet). As the water level depth increases due to pumping, the flow rate declines because of the increased lift required. Flow rates up to 3 gallons per minute are attainable with surface suction pumps.

For water level depths greater than about 25 feet, small electric submersible pumps or compressed air (or nitrogen) displacement pumps designed for 2 or 4 inch diameter wells are used to purge monitoring wells. These pumps push water from inside the well to the surface through attached tubing and require downhole electrical or air lines to activate the pump. The flow rate of these downhole pumps rarely exceeds 2 gpm.

The inventor routinely purges 2" diameter monitoring wells where the water level depth is less than 25 feet with a 12 volt surface suction pump connected to dedicated (stays in the well) purge tube having a bottom check valve. The impetus for this invention was the effort required to purge some monitoring wells where the water level depths were greater than about 25 feet and where the flow rate of the surface suction pump was very low or zero. In these situations the inventor would purge the wells by hand by rapidly jacking the purge tube up and down until the requisite three to five well bore volumes were pumped from the well.

The invention provides a means of translating rotary motion in the horizontal plane, such as provided by a portable hand drill, to rapid, cyclic, up and down motion of a well pump tube so that the well can be pumped from any depth without placing a pump in the well. The present embodiment of the invention can pump a constant 2.5 gallons per minute from a 2 inch diameter monitoring well regardless of the water level depth or changes in the water level depth.

Other applications of the rotary-to-linear motion translater described herein are given in the claims section below.

BRIEF SUMMARY OF THE INVENTION

The invention uses rotary motion in one plane (e.g. horizontal plane) to cause sinusoidal linear motion in a direction normal to the plane (e.g. vertical plane—cyclic up and down motion). The up and down motion is transferred to a well pump tube with bottom check value so that water or other fluids can be pumped from any depth. Alternate embodiments of the invention replace the well pump tube and check valve with a driven piston, confining cylinder, and check valve to allow creation of a partial vacuum, compression of a fluid, or pumping of any flowable material.

BRIEF DESCRIPTION OF THE DRAWINGS

The invention is described in greater detail with reference to the two accompanying line drawings, which illustrate two preferred embodiments of the invention.

DETAILED DESCRIPTION OF THE INVENTION

Figure 1:
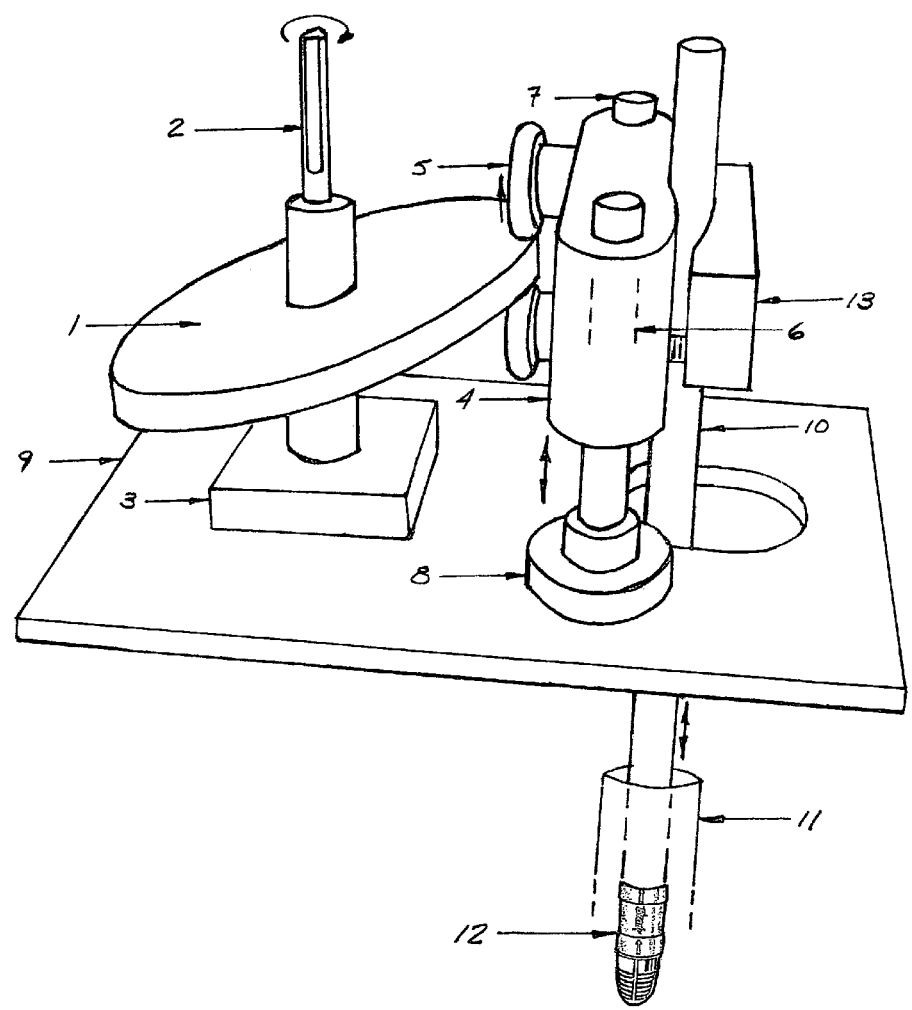
FIG. 1 is a perspective line drawing of the invention with a driven well pump tube.

As shown in FIG. 1, The components of the first preferred embodiment of the invention include at least one elliptical plate means (1) mounted on a rotating shaft means (2), which shaft means (2) runs through the center of gravity of the elliptical plate means (1) and whose axis is at an angle other than 90 degrees from the plane of the elliptical plate means (1), and which shaft means (2) is keyed or otherwise attached to the elliptical plate means (1) such that rotational movement of the shaft means (2) about its axis is transferred to the elliptical plate means (1); mechanical support and bearing means (3) mechanically attached to the base plate means (9) to provide rotational support to the shaft means (2) and attached elliptical plate means (1); at least one elliptical plate follower means (4) affixed with rollers or bearing means (5) positioned on the top and bottom surfaces of the elliptical plate means (1) at a fixed distance from the axis of the shaft means (2); said follower means (4) constrained by rollers (6) and roller races (7) or bearing means to allow bidirectional linear movement of the follower means (4) only in a direction parallel to the shaft means (2) axis; support brackets means (8) for the roller races means (7) mechanically affixed to the roller races means (7) and base plate means (9). As the shaft means (2) rotates either clockwise or counterclockwise, the top and bottom surfaces of the elliptical plate means (1) bear on the follower rollers means (5) and cause the attached follower means (4) to move in an alternating bidirectional lineal manner. The follower means (4) travel distance parallel to the shaft means (2) axis is determined by the distance of the follower rollers means (5) from the axis of the rotating shaft means (2) and the angle between the plane of the elliptical plate means (1) and the axis the shaft means (2). The bidirectional linear motion of the follower means (4) is transferred to at least one well pump tube means (10) with a bottom check valve means (11) installed inside a well (12) by affixing the follower means (4) to the pump tube means (10) by at least one mechanical attachment means (13). With the shaft means (2) axis aligned vertically, for every horizontal revolution of the shaft means (2) and elliptical plate means (1), the follower means (4) and affixed pump tube means (10) move one follower means (4) travel distance down (down stroke) and one follower means (4) travel distance up (up stroke). On the down stroke, the pump tube means (10) is forced down one follower means (4) travel distance with a velocity that opens the bottom check valve means (1) which allows water to enter the pump tube means (10) and displace water already in the pump tube means (10). On the up stoke, the pump tube means (10) is forced up with a velocity that closes the bottom check valve means (10) which allows water to be retained in the pump tube means (10) and be lifted up one follower means (4) travel distance. In this manner water is incrementally added to the pump tube means (10) above the water level in the well (12). Once the pump tube means (10) is full of water, additional water added to the pump tube means (10) by alternating up and down strokes is discharged from the top of the pump tube means (10) and from the well (12). At high rotational velocity of the shaft means (2) and elliptical plate means (1), the follower means (4) and pump tube means (10) move up and down with high velocity. On the up stroke, this high velocity imparts upward momentum to the water column in the pump tube means (10). The imparted momentum is harvested to move water out of the pump tube means (10) by the very rapid reversal of the direction of the pump tube means (10) on the high velocity down stroke.

For a constant angular rotation of the shaft means (2) and elliptical plate means (1) the velocity of the up and down motion of the follower means (4) and affixed pump tube means (10) is sinusoidal and the pumping rate of the invention is constant and independent of the depth to groundwater.

Figure 2:
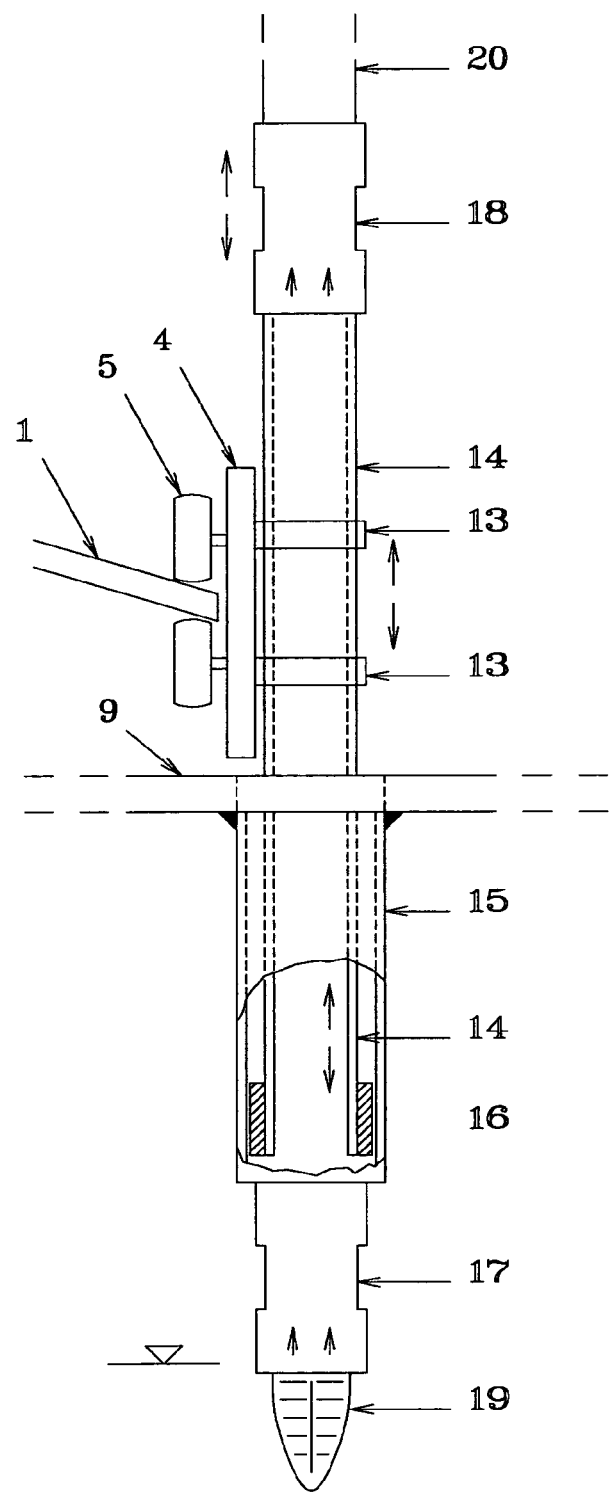
FIG. 2 is a line drawing of the invention showing a driven piston, confining cylinder, and check valves that replace the well pump tube to allow creation of a partial vacuum and compression and pumping of any flowable material.

As shown in FIG. 2, the well pump tube (10) of the first preferred embodiment of the invention is replaced by additional components 14 through 20 to comprise the second preferred embodiment of the invention. The bidirectional linear motion of the elliptical plate follower means (4) is transferred to at least one pipe means (14) closely fitted inside a confining cylinder means (15) by means of an attached annular seal means (16). A lower check valve means (17) that is normally closed and that opens upward under pressure is mechanically attached to the confining cylinder means (15) below the lower travel distance of the pipe means (14) and attached annular seal means (16). An inlet screen means (19) that is to be completely submerged in water (pond, stream, or holding tank) is attached to the bottom of the lower check valve means (17).

The top of the confining cylinder means (15) is mechanically attached to the base plate means (9). An upper check valve means (18) that is normally closed and that opens upward under pressure is mechanically attached to the pipe means (14) above the mechanical attachment means (13) that affix the pipe means (14) to the elliptical plate follower means (4).

For every horizontal revolution of the shaft means (2) and elliptical plate means (1), the follower means (4) and affixed pipe means (14) move one follower means (4) travel distance up (up stroke) and one follower means (4) travel distance down (down stroke). On the up stroke, the upward movement of the pipe means (14) and the attached annular seal means (16) creates a partial vacuum inside the confining cylinder means (15). This partial vacuum causes the lower check valve means (17) to open and draw water into the confining cylinder means (15) through the submerged inlet screen means (19). On the down stroke, the downward movement of the pipe means (14) and the attached annular seal means (16) compresses the water inside the confining cylinder means (15). This compression causes the lower check valve means (17) to close. Upon closing of the lower check valve means (17), further downward travel of the pipe means (14) and of the attached annular seal means (16) displaces the confined water upward into the pipe means (14). This upward displacement of water in the pipe means (14) forces the upper check value means (18) open to admit water in the pump tube means (20). On successive cycles the upper check valve means (18) closes on the down stroke due to the imposed head of water in the pump tube means (20). Because the pump tube means (20) can extend to any desired elevation above the level of the standing water, water can be pumped to any desired elevation consistent with sufficient strength of materials and power supplied to the shaft means (2).

For a constant angular rotation of the shaft means (2) and elliptical plate means (1) the velocity of the up and down motion of the follower means (4) and affixed pipe means (14) is sinusoidal and the pumping rate of the invention is constant and independent of the elevation to which water is pumped.

The invention claimed is:

1. A portable pump comprising at least one rotating elliptical plate means mounted on a rotating shaft means, which shaft means runs through the center of gravity of the plate means and whose axis is at an angle other than 90 degrees from the plane of the elliptical plate means, and which shaft means is keyed or otherwise attached to the elliptical plate means such that rotational movement of the rotating shaft means about its axis is transferred to the elliptical plate means; mechanical support and bearing means to provide rotational support to the rotating shaft means; at least one elliptical plate follower means affixed with rollers or bearing means positioned to bear on the top and bottom surfaces of the elliptical plate means at a fixed distance from the axis of the rotating shaft means; rollers and roller races or bearing means to allow linear movement of the elliptical plate follower means only in a direction parallel to the rotating shaft means axis; a well pump tube means with a bottom check valve means affixed by mechanical attachment means to the elliptical plate follower means so that horizontal rotation of the rotating shaft means causes filling, lifting and draining of the pump tube and check valve means so as to pump water or other fluids from a well.

2. A pump according to claim 1 wherein said pump tube and check valve means are replaced by at least one assembly of a piston, confining cylinder, and check valve means for creating a partial vacuum, compressing a fluid, and/or pumping flowable material.

3. A pump according to claim 1 wherein the rotation of the rotating shaft means is constant so that the pumping rate is also constant.

4. A pump according to claim 2 wherein the rotation of the rotating shaft means is constant so that the evacuation, compressive rate, or pumping rate of flowable material is also constant.

* * * * *